Patented Apr. 9, 1929.

1,708,590

UNITED STATES PATENT OFFICE.

JOSEPH NEWELL REESON, OF MELBOURNE, VICTORIA, AND WILLIAM LANCELOT MOSS, OF CAMBERWELL, VICTORIA, AUSTRALIA.

PROCESS FOR PURIFYING COAL OR OTHER GASES.

No Drawing. Application filed March 13, 1925, Serial No. 15,340, and in Australia April 30, 1924.

This invention has been devised to provide a process for purifying gas i. e. the removal therefrom of particularly hydrogen sulphide, bisulphide of carbon, thiohydrocarbons and cyanogen compounds.

The invention is particularly useful for treating coal gas, and will be described herein in reference thereto, but it is to be understood that the use of the invention is not limited thereto, as it may be applied to any gases containing hydrogen sulphide and other sulphide compounds, such as industrial gases, blast furnace gases and all waste gases from any process.

In view of the departure from the accepted practice of the present invention, and the vast importance of the results obtained thereby, it is necessary to make a full disclosure and have a proper understanding of the significance of the process for the purifying of coal or other gases hereinafter described to premise the description of the process by clearly indicating the nature of the problems involved.

The present means employed in the purification of coal gas, consists in the employment of purifiers comprising large rectangular boxes sufficiently deep to hold several layers of purifying material, usually hydrated oxide of iron, and during treatment, it is necessary from time to time that the oxide be removed from the purifier and exposed to the oxygen of the air by turning it over and allowing it free access to it, such operations cause considerable expense and waste of time, both greatly adding to the cost of production, and further the cost of installation and renewal of such apparatus is very large.

Our invention overcomes the foregoing disadvantages by providing a process in which the gas is purified as required in a simple, expeditious and thorough manner.

Another object of this invention is to provide a process for the purification of gas, whereby during treatment the impurities from the gas are recovered in a condition suitable for commercial purposes.

Another object of this invention is to provide a process for the purification of coal or other gases, wherein the purifying solution is regenerated to render it fit for further use.

Another object of this invention is to provide a process for the purification of coal or other gases, wherein the purifying solution is prepared in a form suitable for gas purification purposes, as hereinafter described.

Another object of this invention is to provide a process for the purification of coal or other gases, wherein during the process the sulphur is recovered in its elementary condition as hereinafter specified.

Another object of this invention is to provide a process for the purification of coal or other gases, wherein during the process the cyanogen compounds are recovered as hereinafter described.

A further object of this invention is to provide a process for the purification of gas, whereby the treatment is carried out and the plant necessary therefor may be installed and operated at a small cost in comparison with that incurred with the present means used for the purification of gas. In addition the regeneration of the purifying solution is accomplished.

Our invention is as follows:—

We provide a number of suitable vessels arranged in any desired manner, the gas is passed through such vessels, and in doing so comes into contact with and is washed by a liquid contained therein, such liquid being an alkaline solution of iron hydroxide.

In the preparation of the said solution an iron compound is used, preferably the sulphate or the chloride, to which has been added any substance having the property of precipitating iron such as the hydrates or carbonates of potassium sodium, or ammonium and organic bases such as pyridine and quinoline and the like.

An essential feature of this invention is that in the preparation of the solution of iron hydroxide, substances having a solvent action in neutral or alkaline solution on hydrate of iron are employed, such for instance as salicylic acid, para hydroxybenzoic acid and phthalic acid and their alkali metal salts, polyatomic alcohols and their derivatives including the glycols and glycerine, citric acid and citrates, isomers of tartaric acid and their alkali metal salts.

During the process of purification, the prepared solution of iron hydroxide absorbs hydrogen sulphide, and cyanogen compounds are absorbed as ferrocyanide and carbonyl ferrocyanide, and further, the bisulphide of carbon and thiophene are removed partly by the suspended sulphur obtained during the regeneration of the solution and partly as thiocarbonate which becomes oxidized in the subsequent regeneration of the solution, as an example a suitable washing solution may be prepared by adding to a 2% solution of sulphate of iron 1 to 5% of one of the organic substances specified, neutralizing with soda ash and oxidizing by aerating with air.

It is obvious that the prepared solution of iron hydroxide may be used in any type of gas washer where the gas to be purified can be brought into intimate contact with the solution and the process of purification and regeneration can be performed continuously or intermittently as desired.

When regeneration of the solution is necessary this can be accomplished by aeration by means of air or oxygen at a low or high temperature and preferably under pressure. In regeneration the air exerts an oxidizing action and causes a deposition of sulphur which remains in suspension and formation of polythionic acids which consume a portion of the alkali used and the iron purifying solution is reformed and oxidized and is then ready for further treatment of gas. Further alkali is added in quantity sufficient to keep the solution neutral or alkaline and further iron salt to replace that consumed by the cyanogen compounds. The sulphur can be removed and further treated as required. Cyanogen compounds gradually accumulate in the washing liquor which is ultimately treated to recover both these and the sulphur acids, as saleable salts, which I find is efficiently accomplished by evaporation of the washing liquor.

We would have it understood that we do not arbitrarily confine ourselves to the hereinbefore mentioned chemicals or the various steps arranged in the process, as they may be varied for the particular purpose, without departing from the nature of our invention.

We claim:

1. A solution for purifying gas containing $H_2S$ and other impurities formed by combining a base, an iron salt, and citric acid.

2. In a process for purifying gas containing $H_2S$ and other impurities, treating the gas with a non-acidic solution containing an hydroxide of the iron family and citric acid.

3. In the process of purifying gas containing $H_2S$ and other impurities, subjecting the gas to the action of a non-acidic solution containing iron hydroxide and citric acid.

4. In a process for purifying gas containing $H_2S$ and other impurities, subjecting the gas to the action of a solution containing iron hydroxide, a base, and citric acid.

5. In a process for purifying gas containing $H_2S$ and other impurities, subjecting the gas to the action of a solution containing a base, iron hydroxide, and a solvent for said hydroxide, the said solution acting to absorb hydrogen sulphide, carbon bisulphide, thiocarbons, hydrocyanic acid and cyanogen compounds, from the gas, and regenerating the said solution by subjecting it to aeration by means of air or oxygen, under pressure.

6. In the process for purifying gas containing $H_2S$ and other impurities, washing the gas with a solution formed by combining a base and iron salt, a solvent for the resultant hydroxide, and continuously adding to such solution in sufficient quantity further amounts of said base and salt to replace that consumed during washing of the gas and the absorption of cyanogen compounds therefrom, and regenerating the foul solution by aeration with air under pressure resulting in reformation of the hydroxide and recovery of the sulphides absorbed from the gas as elemental sulphur.

7. In a process for purifying gas containing $H_2S$ and other impurities, treating the gas with a solution comprising a base and an iron salt, and a solvent for the resultant hydroxide continuously by passing the gas through the solution and continuously regenerating the solution with air under pressure.

In testimony whereof we have signed our names to this specification.

JOSEPH NEWELL REESON.
WILLIAM LANCELOT MOSS.